(12) United States Patent
Ogden

(10) Patent No.: US 7,341,627 B2
(45) Date of Patent: *Mar. 11, 2008

(54) FIBER REINFORCED CONCRETE PRODUCTS AND METHOD OF PREPARATION

(75) Inventor: J. Herbert Ogden, Valley Forge, PA (US)

(73) Assignee: Ogden Technologies, Inc., Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/061,123

(22) Filed: Feb. 18, 2005

(65) Prior Publication Data

US 2006/0185562 A1 Aug. 24, 2006

(51) Int. Cl.
*C04B 14/38* (2006.01)
*C04B 14/36* (2006.01)

(52) U.S. Cl. ............... 106/814; 106/671; 106/717; 106/724; 106/790; 106/802; 106/819; 106/823; 264/333; 428/98; 428/220; 428/299.1; 428/367

(58) Field of Classification Search ......... 106/814, 106/671, 713, 717, 724, 790, 802, 819, 823; 264/333; 428/98, 220, 299.1, 367
See application file for complete search history.

(56) References Cited

U.S. PATENT DOCUMENTS

| | | | |
|---|---|---|---|
| 5,366,600 A | | 11/1994 | Westhof et al. |
| 5,422,174 A | | 6/1995 | Shintani et al. |
| 5,685,902 A | | 11/1997 | Tezuka et al. |
| 5,836,715 A | * | 11/1998 | Hendrix et al. ............ 404/134 |
| 6,263,629 B1 | * | 7/2001 | Brown, Jr. ............... 52/309.16 |
| 6,962,201 B2 | | 11/2005 | Brothers |

FOREIGN PATENT DOCUMENTS

| | | |
|---|---|---|
| EP | 288070 A2 | 10/1988 |
| JP | 55-166877 A | 12/1980 |
| JP | 62-226850 A | 5/1987 |
| JP | 2-69207 A | 3/1990 |
| JP | 02-275739 A | 11/1990 |
| JP | 3-150241 A | 6/1991 |
| JP | 3-180561 A | 8/1991 |
| JP | 3-185176 A | 8/1991 |
| JP | 3-193645 A | 8/1991 |
| JP | 6-166954 A | 6/1994 |
| JP | 07-66584 A | 3/1995 |
| JP | 8-325050 A | 12/1996 |

OTHER PUBLICATIONS

Derwent Abstract No. 1990-166621, abstract of Japanese Patent Specification No. 02-105830A (Apr. 1990).
Derwent Abstract No. 2002-104044, abstract of Korean Patent Specification No. 341020B (Jun. 20002).
Photographs/diagram with captions "Wrapping bridge pier with carbon fiber fabric" and "Finished patch" (unknown author and unknown date).
Dewent Abstract No. 1982-03825J, abstract of Japanese Patent Specification No. 82-051703B (Nov. 1982).
Derwent Abstract No. 1983-03709k, abstract of Japanese Patent Specification No. 82-059635B (Nov. 1982).

* cited by examiner

*Primary Examiner*—Anthony J. Green
(74) *Attorney, Agent, or Firm*—John F. A. Earley, III; Frank J. Bonini, Jr.; Harding, Earley, Follmer & Frailey

(57) ABSTRACT

Concrete products and mixes with reinforcing carbon graphite fibers, the carbon fibers being provided in the form of resin coated warped beam fabric, and a method for producing reinforced concrete products, where semi-cured carbon fibers are mixed with concrete and then cured through the hydration step to result in the formation of strengthened concrete products.

22 Claims, 1 Drawing Sheet

FIBER REINFORCED CONCRETE PRODUCTS AND METHOD OF PREPARATION

BACKGROUND OF THE INVENTION

1. Field of the Invention

The invention relates to concrete products, and specifically concrete products reinforced with carbon graphite fibers.

2. Background of the Invention

Concrete is used for a wide variety of purposes, including road and bridge building, and, in particular, for the supports of elevated road beds and highways, as well as pilings and pillars. Concrete also has uses in building structures such as skyscrapers, high rises, including commercial as well as residential applications. Concrete may be prepared as a mixture to which water may be added. This permits concrete to be poured and formed on site. Alternately, concrete may be preformed and supplied in structures which may be moved into position, or, if heavy, lifted by a crane.

In addition, concrete, by its nature, has been known to undergo degradation, deterioration, crumbling, cracking, as well as separation of the concrete matrix. This can occur over time or by exposure to extreme or repeated weather or other environmental conditions. Stresses, such as wear, movement, vibrations and the like may also contribute to the aforementioned problems associated with concrete. It has been known in the art to install carbon in a concrete product in the form of a filament or tow (i.e., a continuous yarn). These filaments, however, still do not solve the problem as they are tight and unable to be penetrated. Thus, there is no way to bond a carbon filament yarn properly without some separation from the concrete structure. Other prior attempts to reinforce concrete include fiberglass, polymers and steel.

A need exists for a way to reinforce the concrete to alleviate known problems and improve the life and function of the concrete.

SUMMARY OF THE INVENTION

Reinforced concrete products and a method for producing reinforced concrete products are provided by the invention. It is an object of the present invention to provide concrete products and a method for producing concrete products, wherein the concrete products exhibit improved strength and are economical to produce. It is another object of the invention to provide concrete products which are reinforced with carbon graphite fibers, and a method for preparing the reinforced products.

It is a further object of the present invention to utilize the heat of hydration of the cement heat cycle for curing a coating of a carbon fiber present in a cement mixture.

It is a further object of the present invention to utilize the heat of hydration of the cement heat cycle for curing resin coated carbon fibers present in a cement mixture.

These and other objects are provided by my invention.

The concrete products produced in accordance with the present invention may preferably include barriers, in particular, jersey barriers, and terrorist barriers. In addition, the concrete products produced in accordance with the invention may comprise bridge decks, pre-cast concrete structures, pavements, slabs-on-grade, pipes, wall and floor panels, post-tensioned beam anchorage zones, as well as other uses where traditional concrete products have been used. The concrete products of the invention also have use in seismic applications.

DETAILED DESCRIPTION OF THE PREFERRED EMBODIMENTS

Figure 1:
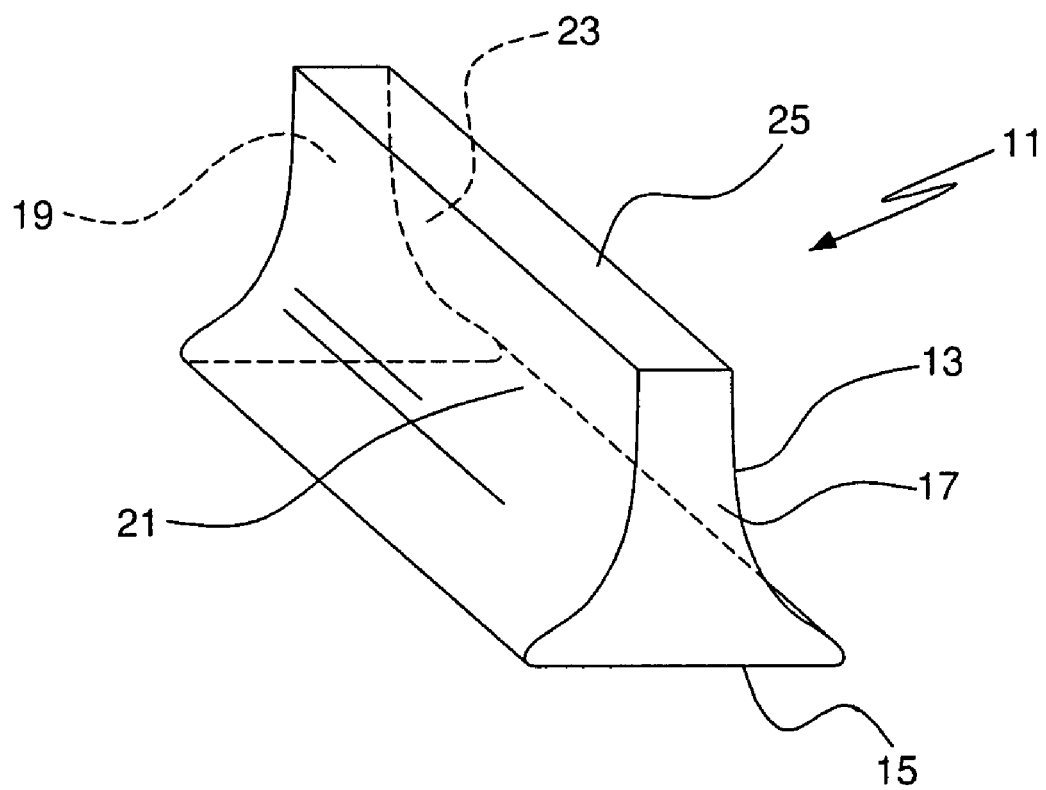
FIG. 1 is a view in perspective of a concrete product constructed in accordance with the invention.

A concrete product in accordance with the invention comprises concrete and carbon graphite fibers. The concrete product is reinforced through the following steps which are employed to produce a reinforced concrete product. The carbon fibers are closed by compressing the fibers, and are semi-cured with a curing agent, such as with a suitable resin, like an epoxy. The semi-cured carbon fibers are mixed with a cement mix and preferably are mixed so as to be uniformly dispersed throughout the mix. The cement mixture with the semi-cured carbon fibers is then hydrated with the addition of water, and the mixture is permitted to cure or set to form a cement or concrete product.

The carbon fibers preferably are tightly compressed carbon graphite fibers having a resinous material, such as an epoxy coating, on them. The carbon fibers preferably may be supplied in a fabric or tape-like form wherein a thin sheet of a binder, such as an epoxy resin holds a plurality of carbon fibers together. Preferably, the carbon fibers are arranged in a unidirectional orientation. The resinous material, such as an epoxy resin binder, is preferably maintained at suitable temperature conditions to prevent premature curing of the epoxy resin to a hardened, brittle state. Preferably, the resinous material is maintained at a temperature of from between about 32 degrees F. to less than about 180 degrees F.

Preferably, the coating material, such as an epoxy, used to coat the carbon fiber is an effective resinous material that provides resistance against the water absorption (e.g., provides hydrophobic properties to the carbon fiber) and sufficient rigidity to allow the fiber to maintain its shape in the slurry mix.

The carbon fibers preferably may have a width of about ⅛" to about 1", with a preferred width being between about ¼" to ½". The carbon fibers preferably may have a length of about 1" to about 4", with a preferred length being from about 2½" to 3½".

The carbon fibers preferably are utilized in the concrete mixture in the form in which they are held by the resinous material and supplied in small pieces. For example, a tape of approximately 2" width, which has carbon fibers of approximately 3" in length may be cut into smaller pieces prior to mixing it with the other cement or concrete components.

The carbon fibers may comprise pan carbon held with a resinous substrate, such as, for example, an epoxy resin.

Carbon fibers suitable for use in the invention include carbon fibers that have been prepregged. For example, one preferred type of carbon fiber is a carbon yarn material which is coated with an epoxy called a prepreg. The material is put through a series of rollers compressing the resin into fibers. Preferably, the rollers used to perform the compressing are heated. The heat along with the compression changes the resin's viscosity into an almost liquid state. The liquid state or semi-liquid state of the resin facilitates penetration of the carbon fibers. Once penetrated or coated, the material is cooled, and preferably placed into storage at a lower temperature, a cold temperature. The material may remain in cold storage until ready to use. The cold storage minimizes the likelihood of the material curing or becoming embrittled.

The material may be stored for a period of time, and generally has a shelf life of up to about 6 months. Generally, the stage at which the carbon prepreg material is used is a stage after the B-stage.

The epoxy resin, however, must not be fully cured, but rather, is provided in the form of a partially cured condition or stage. Preferably, the carbon fibers are bound with epoxy resin, and the epoxy resin is partially cured. It is most preferred that the epoxy resin binding the carbon fibers is in a stage where the resin appears to be in a fully cured state, (e.g., is a flexible solid) but actually is not completely cured, and from that stage may be cured further. Preferably, the epoxy resin useful in the present invention may be cured beyond that stage, and to a point before full curing of the resin. The preferred carbon fibers are unidirectional prepreg carbon fibers cured to the "C-stage".

The carbon fibers and epoxy resin, in its partially cured condition, is preferably added to the concrete mix, the mix is hydrated with water to form a slurry which may be poured into a form, permitted to set, to form a reinforced concrete or cement product.

The carbon fibers may comprise waste material from aircraft production. For example, the carbon fibers may be provided in the form of "carbon waste", a product which is produced by aircraft companies. The "carbon waste" material is generally formed from a carbon warped beam fabric coated with a resin, such as an epoxy or other resins, but which is only partially cured. The aircraft companies routinely use the carbon fabric by cutting it into forms and laminating it to the aluminum wings or other parts of an aircraft. However, there is often waste produced when the carbon warped beam fabric is cut into forms. The additional carbon fabric produced is generally discarded. The invention may utilize carbon waste, which is the partially cured carbon warped beam fabric, or "semi-cured prepreg carbon fiber," to produce a variety of reinforced concrete products. For example, the warped beam fabric may comprise carbon prepreg material which has been taken from cold storage, and allowed to cure further, but not oven cured.

In another embodiment of the invention, the carbon fiber (e.g. yarn or toe) is coated with a resinous material, such as an epoxy resin, using a standard fiber coating process which encapsulates or impregnates the fiber with sufficient coating material to provide adequate hydrophobic properties to the fiber and adequate rigidity to the fiber.

Preferably, the concrete is made from cement, such as Portland cement, or a mix comprising cement, such as Portland cement, and slag and/or stone and/or sand and/or other aggregates. For example, in one embodiment, slag may be present in an amount of up to about 25% of the weight of dry ingredients of the concrete mix. For example, Portland cement components may include calcium (Ca), silica (Si), aluminum (Al), and iron (Fe). The calcium may be provided in the form of limestone or calcium carbonate ($CaCO_3$), the silicon in the form of sand ($SiO_2$), shale and/or clay, which may contain silicon dioxide, aluminum oxides, and iron (III) oxides, and iron ore. Aggregate may also be added to form a concrete mix, or concrete. Suitable aggregate may include stone, slag, rock, ores, and other materials.

Concrete may be varied in composition so as to provide the desired characteristic properties required for a particular application. For example, a concrete slurry in accordance with the invention may contain 10 to 18% cement, 60 to 80% aggregate, 15 to 20% water, and 0.5 to 2% carbon fibers. Entrained air in the slurry may take up to about 8%. Additionally, in accordance with the invention, concrete slurries having different percentages of components than those percentages of the example of this paragraph are included in this invention.

In a preferred embodiment of the invention, a concrete product is produced from a mixture comprising from about 97.5%-99% by weight of cement, and from about 1% to about 2% fibers. Alternately, slag may be added to the mixture, with the slag component being present in an amount of up to about 25% by weight of the mixture, the fiber content preferably in an amount of from about 1% to about 2% by weight of the mixture, and the cement being present in an amount of from about 74% to 98%. In a particularly preferred embodiment, the slag is present in an amount of about 25% by weight, the cement is present in an amout of about 74% by weight, and the carbon fibers are present in an amount of about 1.5% by weight.

In a preferred embodiment of the invention, a concrete product is produced from a mixture comprising cement and "semi-cured prepare carbon fiber". Optionally, slag may be added to the mixture. Preferably, the semi-cured prepreg carbon fiber is uniformly dispersed throughout the mixture. For example, where the carbon fiber is pan carbon provided in a tape of a partially cured epoxy resin, the tape may be cut into small pieces, of about 2" to 3" in length, and about ⅛" to 1" in width. The prepreg carbon material added to the cement or concrete mix, and is then uniformly dispersed throughout the mixture.

Water is added to the mixture to form a slurry, and the heat of hydration heats the slurry to raise its temperature to facilitate curing of the epoxy resin of the semi-cured carbon fiber in the slurry.

The slurry may then be used by placing it into a suitable form to create a desired structure or product. The curing of the resinous material, such as an epoxy, may take place while the cement is being mixed to form the slurry, and/or may also take place while the slurry is setting after is has been poured into a form or other location.

The presence of the resinous material, such as an epoxy, produces an exceptionally strong chemical bond between the carbon fibers and the cement. The invention further provides bonding of the cement and carbon fibers to create strong associations between the carbon fibers and the cement. In a preferred embodiment of the invention, the carbon fibers are bonded to the cement through double bonds with cross-linking of the molecular structure.

The concrete products of the invention have improved performance characteristics over prior art concrete products. For example, the concrete products of the invention have improved overall strength. The overall strength is improved to provide the finished concrete product with a stronger matrix. In accordance with the invention, the inclusion of the carbon graphite fibers to cement improves the performance characteristics of the resulting concrete product with respect to degradation, deterioration, crumbling, cracking and separation, and the inclusion of such carbon graphite fibers to the concrete increases the post-cracking resistance of the resulting concrete product that helps prevent deteriorated concrete from separating. The advantagous properties of the inventive concrete product also include providing the concrete with a very high impact resistance and a very high abrasion resistance. The inventive concrete material holds together under high impact force and resists spalling, resulting in a virtually shatterproof product. The inventive concrete product has a substantially shatterproof performance characteristic.

The following example is illustrative of the invention.

EXAMPLE I

| Component | Weight |
|---|---|
| Cement | 724 |
| Slag | 310 |
| Sand | 1600 |
| Pea gravel | 1267 |
| Carbon Fiber | 57.32 |
| Water | 460 |
| Total | lbs |

The procedure set out above may be used to form a concrete mix of the invention with the dry components of the formulation of Example I. Further, the procedure set out above may be used to form a slurry of the invention with the formulation of Example I and a concrete product of the invention with the formulation of Example I.

The water/cement ratio is 0.444.

Typical flexural strength for a standard concrete product not reinforced with fiber in accordance with the invention is in a range of 12-15% of the compressive strength. In contrast, the ratio of flexural strength to compressive strength is 40%.

Turning to FIG. 1, there is shown a concrete product 11, in the form of a barrier, constructed in accordance with the invention. The exemplary concrete product 11 shown in the drawing comprises a body 13 having a base 15, a front face 17, a rear face 19, side faces 21 and 23, and an upper end surface 25. Concrete products 11 are produced using the method set out above from (a) cement, preferably Portland cement, (b) carbon fiber, such as the carbon waste, referred to as semi-cured prepreg carbon fiber, and optionally (c) slag and/or stone and/or sand and/or other aggregates.

A representative example of a concrete product in accordance with the present invention was prepared by mixing Portland cement, aggregate and industrial carbon yarn (carbon fiber) made with about 45,000 filaments and coated with a 2% epoxy. The resultant mixture was hydrated with water, and the hydrated mixture placed into a form an allowed to set. An improved concrete product was produced, having a stronger matrix.

The concrete products of the present invention include Jersey barriers and terrorist barriers, including panels. Among other products which may be produced in accordance with the present invention are included: precast (non-prestressed) panels, such as for example, tilt-up wall panels, floor panels, and the like), bridge decks, post-tensioned beam anchorage zones, pre-cast beams, pipes, slab-on-grade, seismic applications, as well as airstrip pavement.

What is claimed is:

1. A concrete product comprising concrete and carbon fibers,
    wherein the carbon fibers comprise semi-cured carbon fibers evenly dispersed throughout a cement mix that is cured to form the concrete product.

2. The concrete product of claim 1, wherein the carbon fibers comprise carbon fibers semi-cured with a resin coating to a unidirectional fiber configuration.

3. The concrete product of claim 1, wherein the carbon fibers are coated with an epoxy resin.

4. The concrete product of claim 3, wherein the carbon fibers are supplied in a form bound with an epoxy resin, and wherein the resin is in a partially cured condition.

5. The concrete product of claim 4, wherein the partially cured condition of the resin is from a condition past a B-stage condition to a condition prior to being fully cured.

6. The concrete product of claim 1, wherein the carbon fibers are provided as a multitude of small pieces of a resin coated warped beam fabric each piece of fabric having a length from about 1 inch to about 4 inches and a width of from about ⅛ inch to 1 inch.

7. The concrete product of claim 6, wherein the carbon fibers are tightly compressed.

8. The concrete product of claim 1, wherein the carbon fibers comprise carbon waste.

9. The concrete product of claim 1, further including aggregate.

10. The concrete product of claim 1, further including slag.

11. The concrete product of claim 6, the carbon fibers having a length of about 3 inches.

12. The concrete product of claim 1, wherein carbon fibers are provided in the form of a carbon yarn comprising a plurality of filaments and being coated with an epoxy.

13. A dry concrete mix to be mixed with water to form a slurry, the mix comprising cement and carbon fibers, wherein the carbon fiber comprise semi-cured carbon fibers that are evenly dispersed throughout the mix.

14. The concrete mix of claim 13, wherein the carbon fibers comprise tightly compressed carbon fibers.

15. The concrete mix of claim 13, wherein the carbon fibers are coated with an epoxy resin.

16. The concrete mix of claim 13, wherein the carbon fibers are provided as a multitude of small pieces of resin coated warped beam fabric, each piece of fabric having a length of from about 1 inch to about 4 inches and a width of from about ⅛ inch to 1 inch.

17. The concrete mix of claim 13, wherein the carbon fibers comprise carbon waste.

18. A method of reinforcing concrete, comprising the steps of mixing cement, unidirectional carbon fibers semi cured with a resinous binder, and water together to form a slurry, wherein the carbon fibers semi cured with a resinous binder are dispersed evenly throughout the slurry, and
    letting the slurry set in a form to form bonds between the cement and the carbon fibers, thereby obtaining reinforced concrete.

19. The method of claim 18, wherein the carbon fibers are provided as a multitude of small pieces of resin coated warped beam fabric, each piece of fabric having a length of from about 1 inch to about 4 inches and a width of from about ⅛ inch to 1 inch.

20. The method of claim 18, wherein the carbon fibers are provided as a multitude of small pieces of resin coated warped beam fabric, each piece of fabric having a length of from about 2½ to about 3½ inches and a width of from about ⅛ inch to 1 inch.

21. The method of claim 18, wherein the resinous binder comprises an epoxy resin in a partially cured condition, from a condition past a B-stage condition to a condition prior to being fully cured.

22. The method of claim 18, further comprising the step of storing the carbon fibers at a partially cured stage and at a suitable temperature to prevent the resinous binder from completely curing prior to mixing the carbon fibers with one or more of the cement or the water.

* * * * *